Patented Oct. 16, 1945

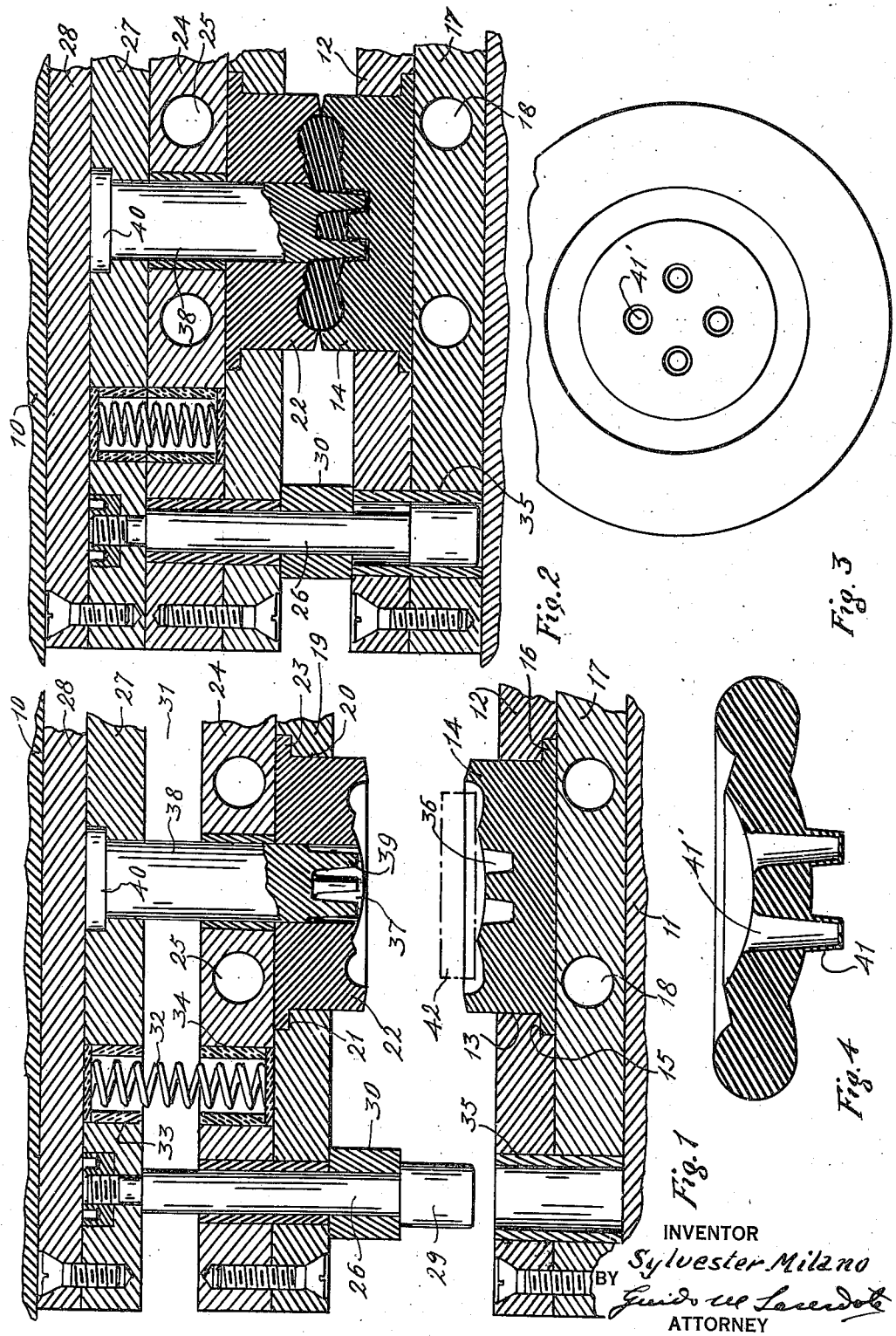

2,387,034

UNITED STATES PATENT OFFICE 2,387,034

METHOD OF PRODUCING PLASTIC ARTICLES

Sylvester Milano, Federalsburg, Md., assignor to Maryland Plastics, Inc., Federalsburg, Md., a corporation of Maryland Application September 10, 1941, Serial No. 410,310

4 Claims. (Cl. 18—47.5)

This invention relates to the art of making buttons and other articles from thermoplastic and thermosetting materials and more particularly refers to improvements in methods of molding buttons and other perforated articles whereby the finishing operations will be considerably simplified.

Buttons and other articles made from plastic material are usually produced by placing the molding material between two component parts of a die while subjecting it to the action of heat and pressure, causing the material to take the shape of the finished article.

In the preferred methods of manufacture the dies used for making buttons are usually provided with pins corresponding to the thread holes to be produced in the buttons, so that the buttons are molded complete in one operation and the necessity of subjecting them to subsequent drilling operations is avoided.

According to one of the methods heretofore in use, both sections of the die are provided with pins so arranged that when the die sections are closed the ends of these pins will about meet in the middle of the mold for forming the holes in the finished button.

By forming the holes by means of pins inwardly projecting from the two opposite surfaces of the button it becomes possible to produce such holes so that they will be flaring at both ends and formed with rounded edges.

However, when the two sets of pins provided in the sections of the die come together they will squeeze between them thin films of plastic material which must be removed by a subsequent operation in order to provide a through passage for the thread, and this operation materially increases the cost of production.

In order to overcome this objectionable feature it has been proposed to use dies in which the thread hole forming pins are provided in one section of the die only, said pins being of a length substantially corresponding to the thickness of the button to be produced, the result being a button provided with tapered thread holes blocked at the smaller end by a very thin, easily breakable, film which must be removed in order to provide a through passage for the thread.

Although this type of die is much easier and less costly to produce than a die in which half length pins are provided in each section, it has been my experience that due to the fact that the aforesaid thin films of plastic material do not project from the surface but actually provide a smooth continuity for said surface, tumbling operations will rarely be sufficient to remove them. On the other hand, if drilling or punching operations are resorted to, the cost of the product will be considerably increased, so that in practice this method does not possess any real advantage over the one previously mentioned.

The present invention has for its main object to provide a novel and improved method of producing buttons and other articles, whereby said articles when molded are formed with relatively thin hollow projections, extending from the surface of the button at the thread holes, these projections being easily breakable and easily removable by means of simple and inexpensive tumbling operations.

Another object is to provide a mold pressed button having easily breakable thin pockets extending therefrom at the thread holes, said pockets being easily removable by subjecting the button to tumbling in a step following the molding operation.

A further object is to provide a method which may be practiced by means of a sectional mold for producing perforated plastic articles of the character specified, said mold comprising two sections, one of which is provided with a plurality of hole forming pins adapted to extend entirely through and beyond the thickness of the molded article, the other section having recesses adapted to receive the tip ends of said pins, leaving a thin clearance space therebetween to form in the button or other article thin hollow projections extending from the surface at said holes.

Other objects and advantages of the present invention will more fully appear as the description proceeds and will be set forth and claimed in the appended claims.

In carrying out my invention I prefer to use a type of double action die, such as I have described and claimed in another application for patent entitled Apparatus for producing molded plastic articles, Serial No. 410,309, now Patent No. 2,339,792, filed simultaneously herewith, in which the hole forming pins are caused to penetrate through the body of the button or other article only after the material has been fused to a sufficiently plastic condition, in order to avoid the possibility of cracks, distortion of design, and imperfections, it being understood, however, that I do not thereby limit myself to the exclusive use of this type of die.

My invention is illustrated by way of example in the accompanying drawing, in which:

Fig. 1 is a fragmentary sectional view of a die adapted to carry my invention into practice, the two sections of the die being apart ready to be moved to their closed position;

Fig. 2 is a similar view showing the various parts of the die after its two sections have reached the closed position and the thread hole producing pins have penetrated through and beyond the mass;

Fig. 3 is a fragmentary plan view in an enlarged scale of a button produced by the die illustrated in Figs. 1 and 2; and Fig. 4 is a cross sectional view of said button.

Referring to Figs. 1 and 2, 10 designates the stationary upper plate and 11 the movable lower plate of a hydraulic press, such as is ordinarily employed in plastic manufacture.

The die proper comprises a lower section fixed on the movable plate 11 and an upper section consisting of a stationary portion fixed to the upper plate 10 and a floating portion supported by guiding pins depending from said stationary portion, said guiding pins cooperating with openings provided in the lower die section for the purpose of properly aligning the unit die sections when said sections are moved to their closed position.

The lower section consists of a retaining plate 12 provided with a number of housings 13, each adapted to snugly receive a lower unit die section 14. The lower end of the housings 13 has an enlarged diameter to provide a peripheral shoulder 15, and the unit die section is correspondingly provided with a peripheral flange 16 registering with said shoulder and acting to retain the unit die section in position.

The lower section further comprises a backing plate 17 secured to the underside of the retaining plate and mounted on the lower press plate 11, said backing plate being provided with steam passages 18, which may be suitably connected to a steam supply system, in order to maintain the die section at a sufficiently high temperature to fuse the plastic material placed in the die.

The floating portion of the upper section of the die similarly comprises a retaining plate 19 provided with housings 20 registering with housings 13 of the lower retaining plate, said housings 20 being formed with a retaining peripheral shoulder 21 and being adapted to snugly receive the upper unit die sections 22 which are also provided with a peripheral retaining flange 23. Said upper section also comprises a backing plate 24 secured to the retaining plate 19 and is provided with steam passages 25, maintaining the upper die section at the required temperature.

As stated, said floating portion is carried by the stationary portion of the upper die section, being slidably supported by guiding pins, such as 26, depending from said stationary portion. To this end, the upper press plate 10 is equipped with a punch and guiding pin retaining plate 27, which is secured thereto through the intermediary of a backing plate 28.

The guiding pins 26 extend downwardly from said plate 27 and are formed with a lower head portion 29 having an enlarged diameter and forming a rest for a spacing bushing 30 interposed between said head and the retaining plate 19. The weight of the floating section 19—24 will normally hold said section in its lower position in which it is supported by the spacing bushings 30 and is spaced a certain distance from the plate 27, as indicated at 31.

However, in practice, I prefer to also provide springs, such as 32, interposed between the stationary and floating portions of the upper die section, said springs serving to gradually increase the working pressure when the floating portion 19—24 is forced against the stationary plate 27. Said springs are preferably incased in heat insulating housings 33, 34, in order to prevent their being adversely affected by the action of heat.

The head portion 29 of the guiding pins 26 registers with corresponding bushings 35 provided in the lower die section for the purpose of properly aligning the unit die sections when the lower die section is forced upwardly against the said upper die section by the action of the press.

As above indicated the main object of the present invention is the production of a button in which the thread holes are formed simultaneously with the body of the button itself by means of pins projecting through and beyond the plastic mass, so as to produce easily removable thin hollow projections extending from the surface of the button at the thread holes.

The lower unit die section is accordingly formed with slightly tapering recesses 36 and the upper unit die section is provided with an opening 37 through which extends a punch 38, the lower end of which is formed integral with a cluster of tapering pins 39 registering with said recesses 36. Said punch 38 is retained in position between retaining plate 27 and backing plate 28 by an enlarged head 40 registering with a corresponding opening formed in the retaining plate 27.

The length of pins 39 is greater than the thickness of the button to be produced by the two unit die sections, so that when said two unit die sections are in their closed position, shown in Fig. 2, said pins extend within recesses 36 and cooperate therewith in forming thin walled hollow extensions 41 at the thread holes 41', as shown in Fig. 4.

The unit die sections 14, 22 project a certain distance from their respective retaining plates 12, 19, said distance being such that when the two unit sections exactly meet, the distance between retaining plates 12 and 19 will correspond to the length of spacing bushings 30.

When the die is in the open position, shown in Fig. 1, the previously prepared tablets of plastic material are placed within the lower unit die sections, as shown at 42. Said tablets are produced by means of a special machine delivering them in compressed solid form so that they can be easily and speedily handled.

The press is then operated to slowly raise the lower die section towards the upper section while the tablets of plastic material are gradually reduced to a plastic condition by the heat transmitted from the steam passages to the unit die sections.

When the upper surface of the tablet comes in contact with the surface of the upper unit die section, if the tablet has not yet softened to a material degree, the floating upper secion will be forced upwardly until the plastic material having finally become fused, the two unit die sections will be enabled to meet and shape the body of the button. At the same time, the lower portion of the die will continue to rise, forcing the floating upper section upwardly against the action of springs 32, the pressure from the lower to the upper section being transmitted through spacing bushings 30 so as to relieve the unit die sections of any extra pressure.

As the floating upper section continues to move towards plate 27, pins 39 of punch 38 will gradually emerge from opening 37 in the upper unit die section until, when backing plate 24 finally comes to abut against retaining plate 27, as shown in Fig. 2, pins 30 will have passed entirely through the plastic mass, extending within recesses 36, thus forming the thread holes in the button, as shown in Fig. 4.

Due to the shape of the pins the thread holes thus produced will be slightly tapering with rounded edges at the wider end. The fact that the thin films of plastic material formed at the thread holes extend from the surface of the button makes their removal very easy by a subsequent tumbling operation. Furthermore, the tumbling will dull the edges of the thread holes remaining exposed after the hollow extensions have been broken off, and the result is a button which can be sewed in place without difficulty, with thread holes having edges which will be easy on the thread.

It will be observed that by virtue of the construction described, the thread hole forming pins cannot be forced through the molding material until such material has reached a sufficiently plastic state. The press piston moves at a relatively slow space so that after the tablets of molding material have become clamped between the two unit die sections there is ample time for such material to become fused or plastic before the thread hole forming pins are actually forced through it. As a result of the conditions thus created the plastic material can be formed exactly to shape and pressed about the thread hole forming pins without danger of breakage or cracking, and a perfectly smooth product of uniform texture is obtained.

It is thus apparent that in this manner I insure conditions whereby no undue strain is placed on the molding material while said material is in a relatively solid state, so that the material is reduced to the best conditions of plasticity before any actual forming or piercing operations are performed on it.

However, although in carrying my invention into practice I prefer to use the type of die described, for the reasons pointed out in my other copending application above referred to, it is within the scope of my invention to use dies of the ordinary type where no floating action is provided for one of the die unit sections. When such a type of die is used, however, it may be necessary or desirable to pre-heat the tablets of molding material before placing them in the die, so as to insure a condition of at least partial plasticity for the material to be treated. It is thus obvious that my invention may be carried into practice in ways different from that shown.

I, accordingly, reserve the right to carry my invention into practice in all those ways and manners which may enter, fairly, into the scope of the appended claims.

I claim:

1. The method of producing from plastic material a mold pressed article such as a button provided with a plurality of holes, which method comprises subjecting a brittle body of plastic material to heat to cause said body to assume a degree of plasticity, subjecting the body to pressure to shape it, thereafter perforating said body to form the holes therein, forming, during the molding operation, thin walled hollow projections over the ends of the holes on one side of the article, the walls of the hollow projections being of substantially uniform thickness and the junction of the hollow projections with the article being on the outer surface of the article and flush with the outermost portion of the article, continuing to subject the body to heat and pressure to complete the molding operation, and tumbling said articles to remove the hollow projections and to form smooth edges at the junction of the hollow projections with the surface of the article.

2. The method of producing from plastic material mold pressed articles such as buttons provided with a plurality of holes extending therethrough, which comprises molding said buttons with a hollow cup-shaped projection having a thin filmlike wall at one end of each of said holes, the junctions of the respective hollow projections with the button being flush with the outermost portion of the surface thereof to afford free access to the junction of the projections with the outer surface of the button, thereby to facilitate the removal of the hollow projections by tumbling and then tumbling the articles to remove said projections and to provide a smooth edge at the junction of the holes with the outermost portion of the surface of the article.

3. The method of producing from plastic material a mold pressed article such as a button provided with a hole extending through the article, which comprises molding said article with a hollow projection at one end of said hole, said projection having a thin filmlike wall extending outwardly from the surface of the article, the junction of the hollow projection with the article being on the outer surface of the article at the edge of the hole and in plane flush with the outer surface of the article at the hole, the adjacent outermost surface of the article surrounding the edge of the hole receding from said plane to facilitate the removal of the projection by tumbling without leaving a rough surface at the outer edge of the hole, and tumbling the article to remove said projection and any rough surface resulting from the removal of the projection.

4. The method of producing from plastic material a molded pressed article such as a button provided with holes extending through the article, which method comprises molding said article with a hollow projection at one end of each of said holes, said projections having thin filmlike walls extending outwardly from the surface of the article, the junction of each hollow projection with the article being on the outer surface of the article at the edge of one of said holes and in a plane flush with the surface of the article at the hole, the adjacent outermost surface of the article surrounding the edge of the hole receding from said plane to facilitate the removal of the projections by tumbling without leaving rough surfaces at the outer edges of the holes, and tumbling the article to remove said projections and any rough surfaces resulting from the removal thereof.

SYLVESTER MILANO.